United States Patent [19]

Nakano et al.

[11] Patent Number: 5,200,283
[45] Date of Patent: Apr. 6, 1993

[54] INFORMATION RECORDING MEDIUM

[75] Inventors: Atsushi Nakano, Yokohama; Dai Imanishi; Tadayuki Shimada, both of Yokosuka; Shigeo Shimizu, Yokohama, all of Japan

[73] Assignee: Victor Company of Japan, Ltd., Yokohama, Japan

[21] Appl. No.: 828,663

[22] Filed: Feb. 6, 1992

[30] Foreign Application Priority Data

Feb. 8, 1991 [JP] Japan .................................. 3-39588

[51] Int. Cl.⁵ .............................................. G11B 7/24
[52] U.S. Cl. ...................................... 430/20; 430/495;
430/945; 359/72; 365/108; 365/112
[58] Field of Search ............... 430/20, 945, 495;
359/72; 365/108, 112

[56] References Cited

U.S. PATENT DOCUMENTS 4,647,521 3/1987 Oguchi et al. .......................... 430/58
5,030,533 7/1991 Bluhm et al. ........................... 430/59

FOREIGN PATENT DOCUMENTS 59-128520 7/1984 Japan ..................................... 359/72

*Primary Examiner*—Charles L. Bowers, Jr.
*Assistant Examiner*—John A. McPherson
*Attorney, Agent, or Firm*—Lowe, Price, LeBlanc & Becker

[57] ABSTRACT

An information recording medium includes a first transparent electrode, and a carrier transport layer formed on the first transparent electrode for generating an electric current on the basis of fed carriers. A carrier generation layer formed on the carrier transport layer serves to generate carriers corresponding to a distribution of an intensity of incident information-writing light containing information, and serves to feed the generated carriers to the carrier transport layer. An electric power supply electrically connected to the first transparent electrode serves to generate an electric field corresponding to the distribution of the intensity of the incident information-writing light in cooperation with the carrier transport layer and the carrier generation layer. A photo-modulation layer formed on the carrier generation layer serves to record the information in the incident information-writing light in response to an application of the electric field generated by the electric power supply, and serves to modulate applied information-reading light in accordance with the recorded information. The photo-modulation layer is made of a complex member of high-molecule material and liquid crystal. A second transparent electrode is formed on the photo-modulation layer, and is electrically connected to the electric power supply. The carrier generation layer is made of inorganic material. The carrier generation layer may be made of organic material. In this case, a separating layer is provided between the photo-modulation layer and the carrier generation layer.

3 Claims, 2 Drawing Sheets

INFORMATION RECORDING MEDIUM

BACKGROUND OF THE INVENTION

This invention relates to an information recording medium suitable for recording, for example, image information. This invention specifically relates to an information recording medium including a photo-modulation layer which has a composite or complex member of polymer and liquid crystal.

Some advanced information recording media have a photomodulation layer for recording optical image information. Such advanced information recording media are able to store a large amount of image information at a high resolution.

U.S. patent application, Ser. No. 691,614, filed on Apr. 25, 1991, now U.S. Pat. No. 5,161,007, which is not prior art to this invention, relates to an information recording medium of this type.

As will be explained later, another background-art information recording medium of this type has some problem.

SUMMARY OF THE INVENTION

It is an object of this invention to provide an improved information recording medium.

A first aspect of this invention provides an information recording medium comprising a first transparent electrode; a carrier transport layer formed on the first transparent electrode for generating an electric current on the basis of fed carriers; a carrier generation layer formed on the carrier transport layer for generating carriers corresponding to a distribution of an intensity of incident information-writing light containing information, and for feeding the generated carriers to the carrier transport layer, the carrier generation layer being made of inorganic material; an electric power supply electrically connected to the first transparent electrode for generating an electric field corresponding to the distribution of the intensity of the incident information-writing light in cooperation with the carrier transport layer and the carrier generation layer; a photo-modulation layer formed on the carrier generation layer for recording the information in the incident information-writing light in response to an application of the electric field generated by the electric power supply, and for modulating applied information-reading light in accordance with the recorded information, the photo-modulation layer being made of a complex member of polymer dispersed liquid crystal; and a second transparent electrode formed on the photo-modulation layer and being electrically connected to the electric power supply.

A second aspect of this invention provides an information recording medium comprising a first transparent electrode; a carrier transport layer formed on the first transparent electrode for generating an electric current on the basis of fed carriers; a carrier generation layer formed on the carrier transport layer for generating carriers corresponding to a distribution of an intensity of incident information-writing light containing information, and for feeding the generated carriers to the carrier transport layer, the carrier generation layer being made of organic material; an electric power supply electrically connected to the first transparent electrode for generating an electric field corresponding to the distribution of the intensity of the incident information-writing light in cooperation with the carrier transport layer and the carrier generation layer; a separating layer formed on the carrier generation layer; a photo-modulation layer formed on the separating layer for recording the information in the incident information-writing light in response to an application of the electric field generated by the electric power supply, and for modulating applied information-reading light in accordance with the recorded information, the photo-modulation layer being made of a complex member of polymer dispersed liquid crystal; and a second transparent electrode formed on the photo-modulation layer and being electrically connected to the electric power supply.

A third aspect of this invention provides an information recording medium comprising a first transparent electrode; a carrier transport layer formed on the first transparent electrode for generating an electric current on the basis of fed carriers; a carrier generation layer formed on the carrier transport layer for generating carriers corresponding to a distribution of an intensity of incident information-writing light containing information, and for feeding the generated carriers to the carrier transport layer, the carrier generation layer being made of inorganic material; wherein the carrier transport layer and the carrier generation layer cooperate to vary an applied electric field in response to the incident information-writing light; a photo-modulation layer formed on the carrier generation layer and being responsive to the applied electric field for recording the information in the incident information-writing light; and a second transparent electrode formed on the photo-modulation layer.

A fourth aspect of this invention provides an information recording medium comprising a first transparent electrode; a carrier transport layer formed on the first transparent electrode for generating an electric current on the basis of fed carriers; a carrier generation layer formed on the carrier transport layer for generating carriers corresponding to a distribution of an intensity of incident information-writing light containing information, and for feeding the generated carriers to the carrier transport layer, the carrier generation layer being made of organic material; wherein the carrier transport layer and the carrier generation layer cooperate to vary an applied electric field in response to the incident information-writing light; a separating layer formed on the carrier generation layer; a photo-modulation layer formed on the separating layer and being responsive to the applied electric field for recording the information in the incident information-writing light; and a second transparent electrode formed on the photo-modulation layer and being electrically connected to the electric power supply.

DESCRIPTION OF THE BACKGROUND ART

Figure 1:
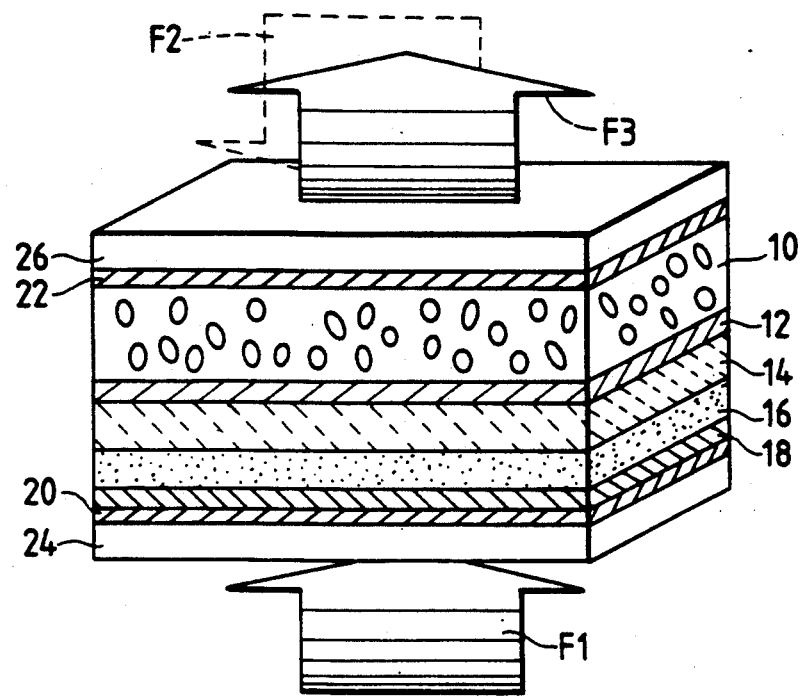
FIG. 1 is a perspective view of a background-art information recording medium.

With reference to FIG. 1, a background-art information recording medium has a lamination of a transparent substrate or a transparent base plate 24, a layer of a transparent electrode 20, a transparent intermediate layer 18, a carrier generation layer 16, a carrier transport layer 14, a separating layer 12, a photo-modulation layer 10, a layer of a transparent electrode 22, and a transparent substrate or a transparent base plate 26 which are sequentially arranged in the order.

The photo-modulation layer 10 is made of a composite or complex member of polymer and liquid crystal.

An electric power source (not shown) applies a drive voltage between the transparent electrodes 20 and 22 so that the region between the transparent electrodes 20 and 22 will be exposed to a drive electric field.

An information recording process is executed as follows. Light F1 containing information is applied to the information recording medium from the side defined by the base plate 24. The information light F1 has a two-dimensional intensity distribution or variation which corresponds to, for example, optical image information. The information light F1 successively passes through the base plate 24, the transparent electrode 20, and the intermediate layer 18, entering the carrier generation layer 16. The carrier generation layer 16 generates carriers in response to the information light F1.

The generated carriers are moved by the drive electric field. Specifically, the generated holes are moved from the carrier generation layer 16 into the carrier transport layer 14, and are then moved toward the transparent electrode 22 through the carrier transport layer 14. This movement of the carriers generates an electric current which depends on the information light F1. The generated electric current has a two-dimensional variation which corresponds to a two-dimensional distrivution of the intensity of the information light F1.

The electric field applied to the photo-modulation layer 10 is varied in accordance with the generated electric current. Liquid crystal molecules in the photo-modulation layer 10 are oriented in accordance with the applied electric field, that is, in accordance with the distribution of the intensity of the information light F1. As a result, the information contained in the light F1 is recorded into the photo-modulation layer 10. Specifically, the conditions of the orientation of liquid crystal molecules in the photo-modulation layer 10 represent the recorded information.

An information reproducing process is executed as follows. Reading light is applied to the information recording medium from the side defined by the base plate 24. The reading light successively passes through the base plate 24, the transparent electrode 20, the intermediate layer 18, the carrier generation layer 16, the carrier transport layer 14, the separating layer 12, and the photo-modulation layer 10. While passing through the photo-modulation layer 10, the reading light is modulated in accordance with the conditions of the orientation of liquid crystal molecules in the photo-modulation layer 10, that is, in accordance with the recorded information. The modulated reading light exits from the photo-modulation layer 10, successively passing through the transparent electrode 22 and the base plate 26 and then travelling out of the information recording medium as output light F3.

Reading light may be applied to the information recording medium from the side defined by the base plate 26 as shown by the arrow F2. In this case, the reading light F2 successively passes through the base plate 26 and the transparent electrode 22, entering the photo-modulation layer 10. After the reading light F2 passes through the photo-modulation layer 10, the reading light F2 is reflected at the boundary between the photo-modulation layer 10 and the separating layer 12 or another place within the information recording medium. The reading light thus travels back through the photo-modulation layer 10, the transparent electrode 22, and the base plate 26, moving out of the information recording medium as output light F3. While passing through the photo-modulation layer 10, the reading light is modulated in accordance with the conditions of the orientation of liquid crystal molecules in the photo-modulation layer 10, that is, in accordance with the recorded information.

Figure 2:
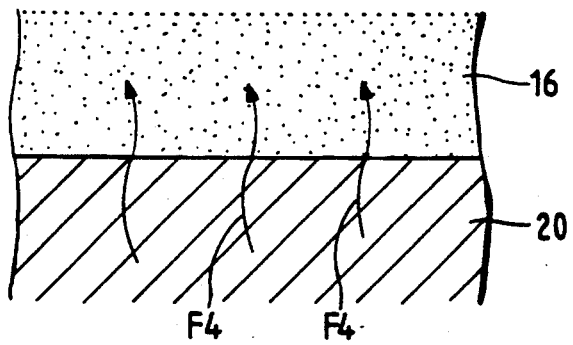
FIG. 2 is a sectional view of a part of a conceivable information recording medium.

In the case where the carrier generation layer 16 is made of organic pigment, if the carrier generation layer 16 and the transparent electrode 20 are directly connected as shown in FIG. 2, carriers tend to be injected into the carrier generation layer 16 from the transparent electrode 20 as denoted by the arrows F4. The carrier injection into the carrier generation layer 16 causes a decrease in the sensitivity of the information recording medium with respect to information light. To prevent such a decrease in the sensitivity, the intermediate layer 18 for blocking the carrier injection is provided between the carrier generation layer 16 and the transparent electrode 20 as shown in FIG. 1.

Figure 3:
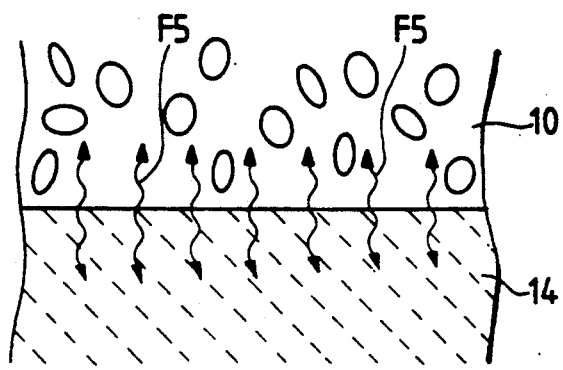
FIG. 3 is a sectional view of a part of another conceivable information recording medium.

If the photo-modulation layer 10 and the carrier transport layer 14 are directly connected as shown in FIG. 3, the layers 10 and 14 tend to melt and mix with each other as denoted by the arrows F5. To prevent the mix between the photo-modulation layer 10 and the carrier transport layer 14, the separating layer 12 is provided between the layers 10 and 14 as shown in FIG. 1.

The information recording medium of FIG. 1 has the following problem. A necessary drive voltage applied between the transparent electrodes 20 and 22 tends to be high as a result of the provision of the separating layer 12 and the intermediate layer 18.

DESCRIPTION OF THE FIRST PREFERRED EMBODIMENT

Figure 4:
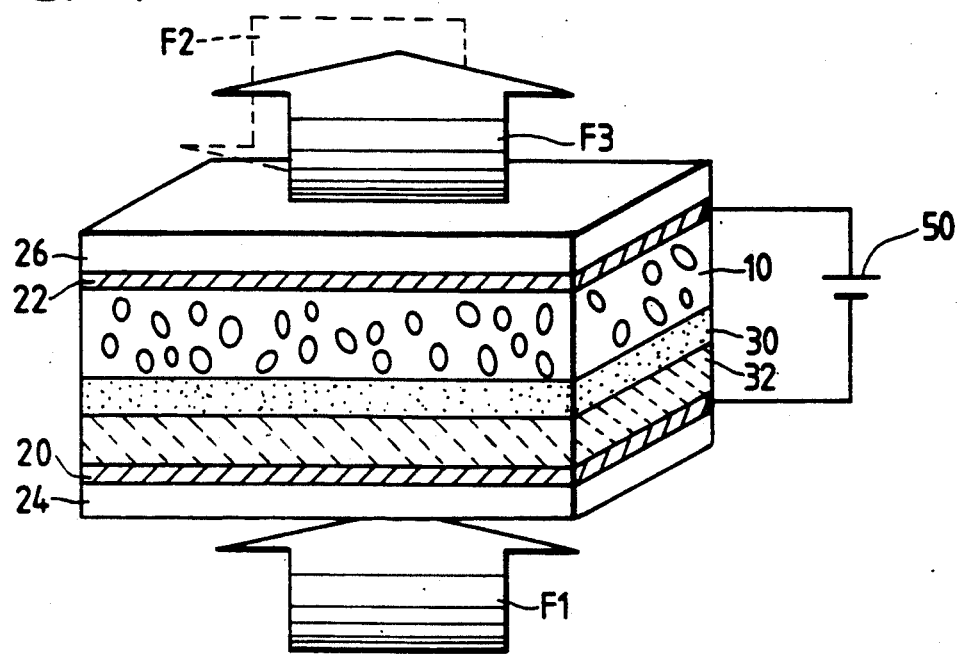
FIG. 4 is a perspective view of an information recording medium according to a first embodiment of this invention.

With reference to FIG. 4, an information recording medium has a lamination of a transparent substrate or a transparent base plate 24, a layer of a transparent electrode 20, a carrier transport layer 32, a carrier generation layer 30, a photo-modulation layer 10, a layer of a transparent electrode 22, and a transparent substrate or a transparent base plate 26 which are sequentially arranged in the order.

The photo-modulation layer 10 is made of a composite or complex member of polymer and liquid crystal.

An electric power source 50 connected between the transparent electrodes 20 and 22 applies a drive voltage between the transparent electrodes 20 and 22 so that the region between the transparent electrodes 20 and 22 will be exposed to a drive electric field.

An information recording process is executed as follows. Light F1 containing information is applied to the information recording medium from the side defined by the base plate 24. The information light F1 has a two-dimensional intensity distribution or variation which corresponds to, for example, optical image information. The information light F1 successively passes through the base plate 24, the transparent electrode 20, and the carrier transport layer 32, entering the carrier generation layer 30. The carrier generation layer 30 generates carriers in response to the information light F1.

The generated carriers are moved by the drive electric field. Specifically, the generated holes are moved from the carrier generation layer 30 into the carrier transport layer 32, and are then moved toward the transparent electrode 20 through the carrier transport layer 32. This movement of the carriers generates an electric current which depends on the information light F1. The generated electric current has a two-dimensional variation which corresponds to a two-dimensional distribution of the intensity of the information light F1.

The electric field applied to the photo-modulation layer 10 is varied in accordance with the generated electric current. Liquid crystal molecules in the photo-modulation layer 10 are oriented in accordance with the applied electric field, that is, in accordance with the distribution of the intensity of the information light F1. As a result, the information contained in the light F1 is recorded into the photo-modulation layer 10. Specifically, the conditions of the orientation of liquid crystal molecules in the photo-modulation layer 10 represent the recorded information.

An information reproducing process is executed as follows. Reading light is applied to the information recording medium from the side defined by the base plate 24. The reading light successively passes through the base plate 24, the transparent electrode 20, the carrier transport layer 32, the carrier generation layer 30, and the photo-modulation layer 10. While passing through the photo-modulation layer 10, the reading light is modulated in accordance with the conditions of the orientation of liquid crystal molecules in the photo-modulation layer 10, that is, in accordance with the recorded information. The modulated reading light exits from the photo-modulation layer 10, successively passing through the transparent electrode 22 and the base plate 26 and then travelling out of the information recording medium as output light F3.

Reading light may be applied to the information recording medium from the side defined by the base plate 26 as shown by the arrow F2. In this case, the reading light F2 successively passes through the base plate 26 and the transparent electrode 22, entering the photo-modulation layer 10. After the reading light F2 passes through the photo-modulation layer 10, the reading light F2 is reflected at the boundary between the photo-modulation layer 10 and the carrier generation layer 30 or another place within the information recording medium. The reading light thus travels back through the photo-modulation layer 10, the transparent electrode 22, and the base plate 26, moving out of the information recording medium as output light F3. While passing through the photo-modulation layer 10, the reading light is modulated in accordance with the conditions of the orientation of liquid crystal molecules in the photo-modulation layer 10, that is, in accordance with the recorded information.

As shown in FIG. 4, the carrier transport layer 32 is present between the transparent electrode 20 and the carrier generation layer 30. In general, the rate of the injection of charges from the transparent electrode 20 into the carrier transport layer 32 is small. Thus, the injection of charges into the carrier generation layer 20 is effectively suppressed by the carrier transport layer 32. Therefore, it is unnecessary to provide an intermediate layer 18 (see FIG. 1), and it is possible to prevent a reduction in the drive electric field which would be caused by the presence of the intermediate layer 18 (see FIG. 1).

As shown in FIG. 4, the carrier generation layer 30 is present between the photo-modulation layer 10 and the carrier transport layer 32. It is preferably that the carrier generation layer 30 is made of inorganic material. The inorganic carrier generation layer 30 can serve as a separating layer 12 (see FIG. 1) which prevents the photo-modulation layer 10 and the carrier transport layer 32 from bleeding and mixing with each other. Therefore, it is unnecessary to provide the separating layer 12 (see FIG. 1), and it is possible to prevent a reduction in the drive electric field which would be caused by the presence of the separating layer 12 (see FIG. 1).

The information recording medium of FIG. 4 was fabricated as follows. First, 2,4,7-trinitrofluorenone and polyethylene terephthalate (PET) were dispersed at a weight ratio of 1:1, so that a tetrahydrofuran solution was obtained. For example, "VYLON 200" produced by Teijin Chemicals Limited was used as polyethylene terephthalate. A glass base plate 24 provided with a transparent electrode 20 was dipped into this solution, so that the solution was applied to the transparent electrode 20. The glass base plate 24 with the transparent electrode 20 and the solution was dried, and the solution formed a carrier transport layer 32 on the transparent electrode 20. The carrier transport layer 32 had a thickness of about 5 $\mu$m. A film of hydrogenated amorphous silicon was formed on the carrier transport layer 32 by using an ECR plasma CVD apparatus. The amorphous silicon layer formed a carrier generation layer 30.

Another glass base plate 26 provided with a transparent electrode 22 was prepared. The glass base plate 26 with the transparent electrode 22, and the glass base plate 24 with the previously-mentioned layers were combined to form a cell having a gap of a thickness of about 10 $\mu$m.

Acrylic oligomer and acrylic acid monomer were mixed in a manner such that the weight ratio between the oligomer and the monomer was in the range from 5:5 to 7:3. For example, "MANDA" produced by Nippon Kayaku Company Limited was used as the acrylic oligomer, and 2-ethylhexyl acrylate was used as the acrylic acid monomer. The mixture of the oligomer and the monomer was a solution. Liquid crystal was mixed with the solution at a rate such that the percentage of the liquid crystal in the resultant mixture was 50% to 70% by weight. The liquid crystal was of the type, exhibiting a smectic phase at a room temperature. For example, "S-6" produced by BHD Limited was used as the liquid crystal. Photo polymerization initiator was added to the mixture solution containing the liquid crystal at a rate such that the percentage of the initiator in the resultant solution was 4% by weight. For example, "DAROCUR 1173" was used as the photo polymerization initiator. The resultant solution was adjusted into a uniform state.

The uniform solution was injected into the gap of the cell. The cell containing the uniform solution was exposed to an ultraviolet ray for 1 to 2 minutes. The ultraviolet ray had a wavelength of 400 nm, and an intensity of 3 mW/cm$^2$. The ultraviolet ray caused a phase separation of the liquid crystal in the uniform solution, and the uniform solution in the cell formed a photo-modulation layer 10.

DESCRIPTION OF THE SECOND PREFERRED EMBODIMENT

Figure 5:
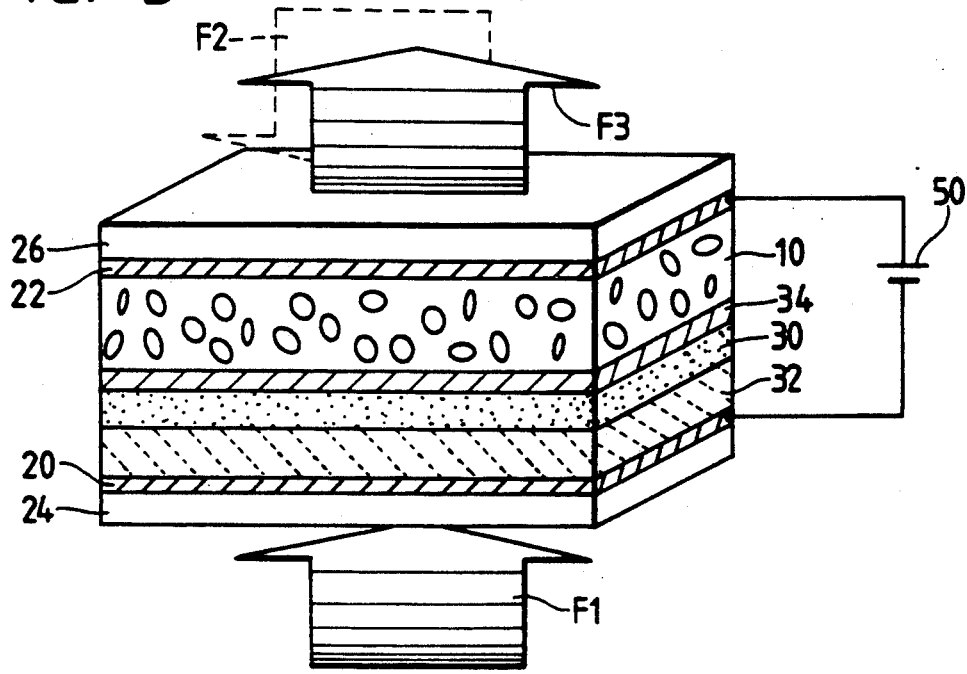
FIG. 5 is a perspective view of an information recording medium according to a second embodiment of this invention.

FIG. 5 shows a second embodiment of this invention which is similar to the embodiment of FIG. 4 except for the following design changes. In the embodiment of FIG. 5, a separating layer 34 is provided between a photo-modulation layer 10 and a carrier generation layer 30, and the carrier generation layer 30 is preferably made of organic material. The separating layer 34 presents the photo-modulation layer 10 and the carrier generation layer 30 from melting and mixing with each other.

The information recording medium of FIG. 5 was fabricated as follows. First, polycarbonate resin and hydrazone compound were dispersed in chloroform at a weight ratio of 1:1 so that a solution resulted. For example, "PANLITE" produced by Teijin Chemicals Limited was used as the polycarbonate resin, and "CTC-191" produced by Anan Corporation was used as the hydrazone compound. A glass base plate 24 provide with a transparent electrode 20 was dipped into the solution, so that the solution was applied to the transparent electrode 20. The glass base plate 24 with the transparent electrode 20 and the solution was dried, and the solution formed a carrier transport layer 32 on the transparent electrode 20. The carrier transport layer 32 had a thickness of about 5 μm.

Next, a layer of titanylphthalocyanine was formed on the carrier transport layer 32 by a vacuum vapor deposition process. The titanylphthalocyanine layer formed a carrier generation layer 30. It should be noted that the carrier generation layer 30 may be formed by dispersing organic pigment into resin.

Polyvinyl alcohol was dissolved in distilled water at a rate such that the percentage of the polyvinyl alcohol in the resultant solution was 10% by weight. The glass base plate 24 provided with the previously-mentioned layers was dipped into the solution, so that the solution was applied to the carrier generation layer 30. The glass base plate 24 with the layers and the solution was dried, and the solution formed a separating layer 34 on the carrier generation layer 30. The separating layer 34 had a thickness of about 1 μm.

Smectic liquid crystal and polymethylmethacrylate was mixed with each other at a weight ratio of 2:1. For example, "S-6" produced by BDH Limited was used as the smectic liquid crystal. A solution was prepared which contained methylethylketone and toluene at a weight ratio of 1:1. The mixture of the liquid crystal and polymethylmethacrylate was dissolved in the ketone-toluene solution, so that a mixture solution resulted. By use of a wire bar, the mixture solution was applied to a PET film base plate 26 provided with a transparent electrode 22. The mixture solution formed a photo-modulation layer 10 on the transparent electrode 22. The transparent electrode 22 was made of, for example, indium tin oxide (ITO). The photo-modulation layer 10 had a thickness of about 5 μm.

Finally, the base plate 24 with the layers, and the base plate 26 with the layers were bonded together so that the information recording medium of FIG. 5 was completed.

What is claimed is:
1. An information recording medium comprising:
 a first transparent electrode;
 a carrier transport layer formed on the first transparent electrode for generating an electric current on the basis of fed carriers;
 a carrier generation layer formed on the carrier transport layer for generating carriers corresponding to a distribution of an intensity of incident information-writing light containing information, and for feeling the generated carriers to the carrier transport layer, the carrier generation layer being made of inorganic material;
 an electric power supply electrically connected to the first transparent electrode for generating an electric field corresponding to the distribution of the intensity of the incident information-writing light in cooperation with the carrier transport layer and the carrier generation layer;
 a photo-modulation layer formed on the carrier generation layer for recording the information in the incident information-writing light in response to an application of the electric field generated by the electric power supply, and for modulating applied information-reading light in accordance with the recorded information, the photo-modulation layer being made of a complex member of polymer dispensed liquid crystal; and
 a second transparent electrode formed on the photo-modulation layer and being electrically connected to the electric power supply.
2. The information recording medium of claim 1 wherein the carrier generation layer is made of amorphous silicon.
3. The information recording medium of claim 1 wherein the carrier transport layer is made of tetrahydrofuran.

* * * * *